United States Patent

Chi-Min et al.

[11] Patent Number: 6,141,645
[45] Date of Patent: Oct. 31, 2000

[54] METHOD AND DEVICE FOR DOWN MIXING COMPRESSED AUDIO BIT STREAM HAVING MULTIPLE AUDIO CHANNELS

[75] Inventors: Liu Chi-Min, Hsinchu; Lee Szu-Wei, Taichung; Lee Wen-Chieh, Taoyuan, all of Taiwan

[73] Assignee: Acer Laboratories Inc., Taipei, Taiwan

[21] Appl. No.: 09/131,653

[22] Filed: Aug. 10, 1998

Related U.S. Application Data

[60] Provisional application No. 60/087,364, May 29, 1998.

[51] Int. Cl.[7] .................................................. G10L 21/04
[52] U.S. Cl. ................................ 704/500; 704/503
[58] Field of Search ................................ 704/500–504

[56] References Cited

U.S. PATENT DOCUMENTS

| | | | |
|---|---|---|---|
| 5,400,433 | 3/1995 | Davis et al. | 395/2.29 |
| 5,488,665 | 1/1996 | Johnston et al. | 704/201 |
| 5,636,186 | 6/1997 | Yamamoto et al. | 369/4 |
| 5,644,310 | 7/1997 | Laczko, Sr. et al. | 341/143 |
| 5,657,423 | 8/1997 | Benbassat et al. | 704/230 |
| 5,729,556 | 3/1998 | Benbassat et al. | 371/31 |
| 5,748,835 | 5/1998 | Lee | 386/104 |
| 5,845,249 | 12/1998 | Malladi et al. | 704/270 |
| 5,946,352 | 8/1999 | Rowlands et al. | 375/242 |
| 5,956,674 | 9/1999 | Smyth et al. | 704/229 |
| 5,970,461 | 10/1998 | Chatterton | 704/500 |
| 5,974,380 | 10/1999 | Smyth et al. | 704/229 |

*Primary Examiner*—Krista Zele
*Assistant Examiner*—Michael N. Opsasnick

[57] ABSTRACT

Improved down mixing of audio channels of compressed digital audio signals by down mixing in the frequency domain. Fast virtual transform is applied to transform short DCT coefficients into long DCT coefficients, and down mixing is performed on the long DCT coefficients. Inverse discrete cosine transform is performed on the down mixed set of long DCT coefficients, generating signals in the windowing domain. The windowing domain signals are then overlapped and added to generate time domain signals suitable for further amplification. Down mixing in the frequency domain reduces the number of computations required.

14 Claims, 4 Drawing Sheets

METHOD AND DEVICE FOR DOWN MIXING COMPRESSED AUDIO BIT STREAM HAVING MULTIPLE AUDIO CHANNELS

This application claims the benefit of provisional U.S. Application No. 60/087,364, filed May 29, 1998, which is hereby incorporated by reference for all purposes.

BACKGROUND OF THE INVENTION

1. Field of the Invention.

This invention relates generally to a method and device for down mixing compressed digital audio bit stream, and more particularly to a method and device for down mixing the multiple channels of a compressed audio bit stream into a lesser number of audio channels.

2. Description of the Prior Art

Audio compression techniques are used wherever there is an economic benefit to be obtained by reducing the amount of digital information required to represent the audio signals. Examples are the Dolby AC-3, Digital Theatre Systems (DTS), and the MPEG audio layer compression algorithms. The Dolby AC-3 compression format has been selected as the audio format for the high definition television (HDTV) standard in the U.S. It is also widely adopted for use in Digital Versatile Disk (DVD) films.

The AC-3 digital compression algorithm can encode 5.1 channels of source audio from a pulse code modulation (PCM) representation into a serial bit stream at data rates ranging from 32 kbps to 640 kbps. The 0.1 channel refers to a fractional bandwidth channel intended to convey only low frequency (subwoofer) signals. Typically, a compression ratio of 1:10 can be achieved using the AC-3 algorithm. Typical applications are in satellite or terrestrial audio broadcasting, delivery of audio over metallic or optical cables, or storage of audio on, magnetic, optical, semiconductor, or other storage media.

The AC-3 algorithm achieves a high compression ratio by coarsely quantizing a frequency domain representation of the audio signal. The first step in the encoding process is to transform the representation of audio from a sequence of PCM time samples into a sequence of blocks of frequency coefficients. The individual frequency coefficients are represented in floating point representation as a binary exponent and a mantissa. These exponents are encoded according to an adaptive coding process and fed to a bit allocation process. The mantissas are then quantized, the degree of quantization determined by the bit allocation process.

The decoding process is basically the inverse of the encoding process. A decoder must synchronize to the encoded bit stream check for errors, and de-format the various types of data such as the encoded spectral envelope and the quantized mantissas. The decoding process mainly comprises the following four steps: (1) the spectral envelope is decoded to produce the exponents; (2) the exponents are fed into the bit allocation process; (3) the bit allocation routine determines the number of bits used to unpack and de-quantize the mantissas; and (4) the exponents and mantissas of the frequency coefficients are transformed back into the time domain to produce the decoded PCM time samples. A more detailed description of the decoding process is set forth below.

DECODING PROCESS OF THE AC-3 BIT STREAM

The AC-3 encoder uses a time-domain-aliasing-cancellation (TDAC) filter bank to transform an input audio sequence x(n) form time domain signals into frequency domain coefficients, or more specifically, DCT (Discrete Cosine Transform) coefficients. The audio sequence is sampled using a 512-point sampling window h(n) to produce a windowed data:

$$w(n) = h(n)x_f(n) \quad (1)$$

where $x_f(n)$ is the $f^{th}$ block sample of 512 input data, and $x_{f-1}$ denotes the $(f-1)^{th}$ block sample of 512 input data. The $x_f(n)$ and $x_{(f-1)}(n)$ samples overlap by 256 points.

The windowed data w(n) is transformed into DCT coefficients through either a 512-point transform or two 256-point transforms according to the data content. The 512-point transform is called the long DCT transform, and the 256-point transform is called the short DCT transform. For the long DCT transform, the long DCT coefficients $y_f(k)$ are obtained from the following formula:

$$y_f(k) = \frac{1}{256}\sum_{n=0}^{511} w_f(n)\cos\left(\frac{\pi}{1024}(2n+1)(2k+1) + \frac{\pi}{4}(2k+1)\right) \quad (2)$$

for $0 \le k \le 255$

For the short DCT transform, the windowed data $w_f(n)$ are segmented into two 256-point data, $w_{f1}(n)$ and $w_{f2}(n)$, and transformed into two sets of short DCT coefficients $y_{f1}(k)$ and $y_{f2}(k)$:

$$y_{f1}(k) = \frac{1}{128}\sum_{n=0}^{255} w_{f1}(n)\cos\left(\frac{\pi}{512}(2n+1)(2k+1)\right) \quad (3)$$

$$y_{f1}(k) = \frac{1}{128}\sum_{n=0}^{255} w_{f1}(n)\cos\left(\frac{\pi}{512}(2n+1)(2k+1) + \frac{\pi}{2}(2k+1)\right)$$

for $0 \le k \le 127$ and $0 \le n \le 255$

To reconstruct the original data, an inverse transform is applied to the DCT coefficients. For long DCT coefficients, the inverse transform formula is $$\tilde{w}_f(n) = \sum_{k=0}^{255} y_f(k)\cos\left(\frac{\pi}{1024}(2n+1)(2k+1) + \frac{\pi}{4}(2k+1)\right) \quad (4)$$

for $0 \le n \le 255$ and $0 \le k \le 127$

For short DCT coefficients, two types of inverse DCT transforms are used:

$$\tilde{w}_{f1}(n) = \sum_{k=0}^{127} y_{f1}(k)\cos\left(\frac{\pi}{512}(2n+1)(2k+1)\right) \quad (5)$$

$$\tilde{w}_{f2}(n) = \sum_{k=0}^{1271} y_{f2}(k)\cos\left(\frac{\pi}{512}(2n+1)(2k+1) + \frac{\pi}{2}(2k+1)\right)$$

for $0 \le n \le 255$ and $0 \le k \le 127$

After the inverse DCT transform, an overlap-and-add procedure is executed. For long transforms, the $\tilde{w}_f(n)$ windowing domain coefficients are multiplied by a synthesis window f(n) and then overlapped and added with previous $\tilde{w}_{f-1}(n)$ coefficients to obtain the original data:

$$\tilde{x}f(n) = \tilde{w}_f(n)f(n) + \tilde{w}_{f-1}(256+n)f(256+n) \quad 0 \le n \le 255 \quad (6)$$

For short transforms, the windowing domain coefficients are combined together: $\tilde{w}_f(n) = \tilde{w}_{f1}(n) + \tilde{w}_{f2}(n)$, and processed through similar operation as the long transforms.

DOWNMIXING

In many reproduction systems, the number of loudspeakers will not match the number of encoded audio channels. For example, the left and right speakers of a typical personal computer are used to output the 5 channels of an AC-3 compressed audio program. In order to reproduce all of the sound effects, down mixing is required. Down mixing is a technique in which the 5 (or 5.1) audio channel signals are intermixed, generating a reduced number of audio channel signals while reserving high audio quality.

Prior art methods of down mixing are performed in the time domain. Basically, the down mixing process is of the form:

$$\begin{bmatrix} Lo(n) \\ Ro(n) \end{bmatrix} = \begin{bmatrix} 1 & c & 0 & s & 0 \\ 0 & c & 1 & 0 & s \end{bmatrix} \begin{bmatrix} L(n) \\ C(n) \\ R(n) \\ S_L(n) \\ S_R(n) \end{bmatrix} \quad (7)$$

where $L(n)$, $C(n)$, $R(n)$, $S_L(n)$, and $S_R(n)$ are the original left, center, right, left surround, and right surround channel signals respectively. The variables c and s are the center and surround mixing level, typically chosen to be between 1 to 0.5. $L_0(n)$ and $R_0(n)$ are the resulting left and right output channels after down mixing.

Figure 1:
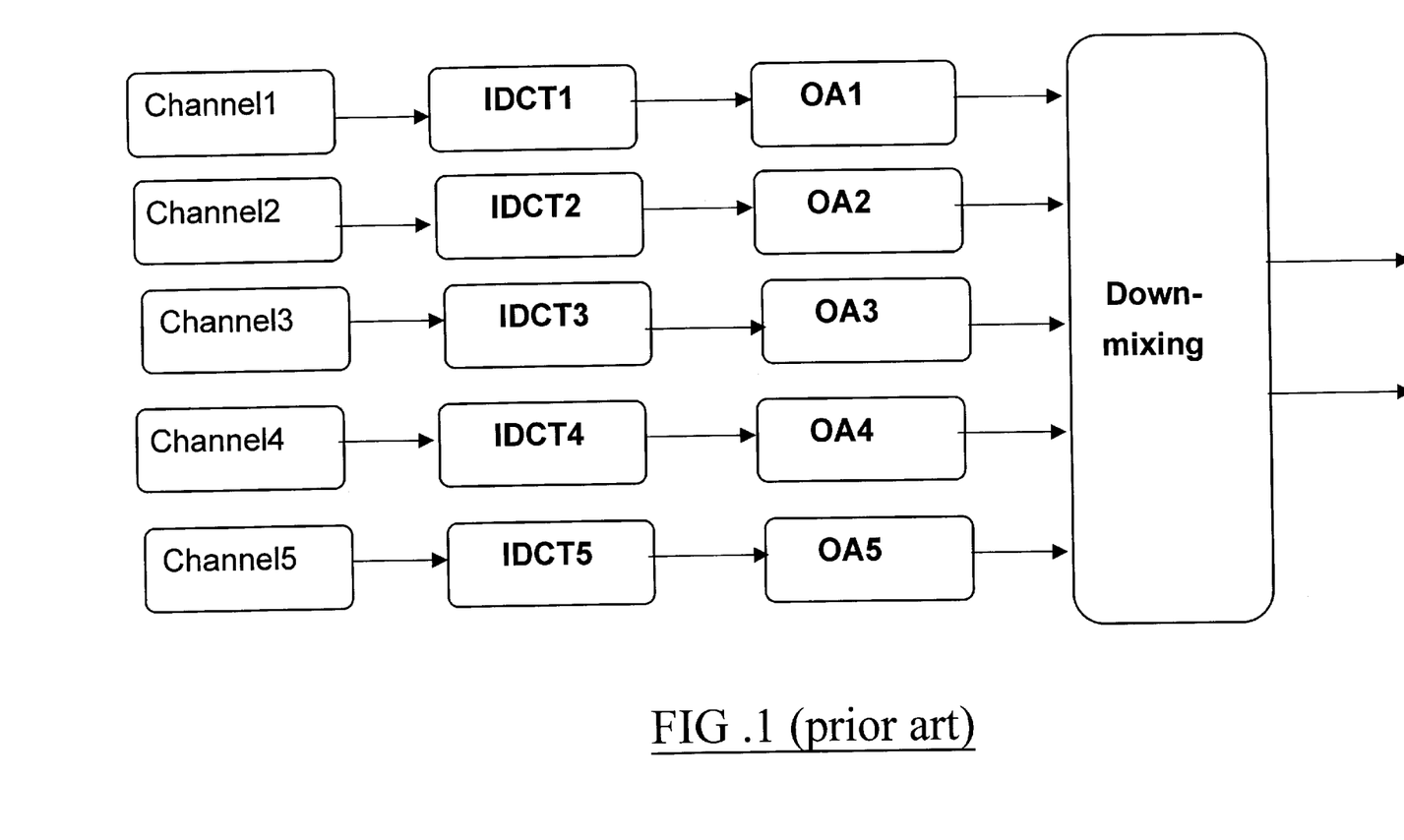
FIG. 1 is a schematic diagram of a prior art decoder for down mixing digital audio bit streams in the time domain.

FIG. 1 shows a prior art decoder for down mixing five channels of audio signals into two channels. Inverse discrete cosine transform (IDCT) and overlap-and-add (OA) are performed individually on each audio channel. The overlap-and-add procedure is required because in the encoding process, overlapping blocks of time samples are multiplied by a time window and transformed into the frequency domain. Due to the overlapping blocks, each PCM input sample is represented in two sequential transformed blocks, and thus have to be reversed in the decoding process.

The inverse discrete cosine transform (IDCT) procedure transforms the audio data from frequency domain coefficients into windowing domain coefficients, and the overlap-and-add (OA) procedure reconstructs time domain audio data from the windowing domain coefficients. The windowing domain coefficients refer to the coefficients still requiring the OA procedure. Due to the complexity of the IDCT and OA transformations, it would be desirable to reduce the number of IDCT and OA operations that is required in the down mixing process.

Figure 2:
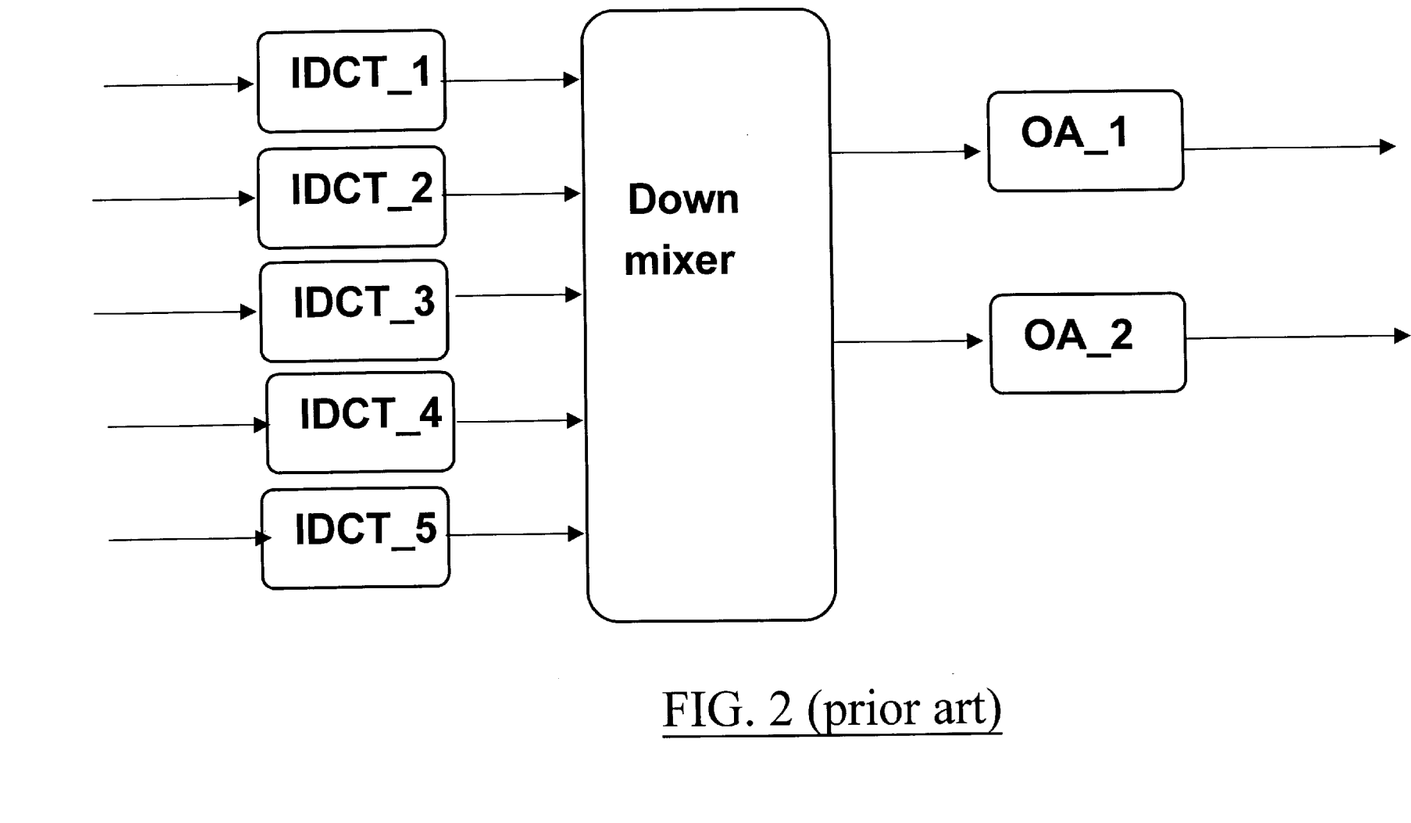
FIG. 2 is a drawing of a prior art decoder for down mixing digital audio bit streams in the windowing domain.

FIG. 2 shows an audio decoder with a down mixer in the windowing domain. The audio decoder comprises five inverse discrete cosine transform circuits IDCT_1, IDCT_2, IDCT_3, IDCT_4, and IDCT_5, a down mixer, and two overlap-and-add circuits OA_1 and OA_2. The inverse discrete cosine transform circuits receive the DCT coefficients of the five audio channels generated from a pre-processor (not shown). The pre-processor receives a compressed audio bit stream, performs error correction and block de-formatting, and separates the DCT coefficients in different channels. These processes are known in the art.

The IDCT circuits receive DCT coefficients of the five audio channels, and output windowing domain coefficients to the down mixer. The windowing domain coefficients are intermixed by the down mixer, generating windowing domain coefficients for the left and right channels. The left and right channel windowing domain coefficients are then transformed by the first and second overlap-and-add circuits OA_1 and OA_2 into time domain coefficients, which are then output to speaker amplification units (not shown in the figure).

The prior art decoder shown in FIG. 2 reduces the number of overlap-and-add circuits, but still requires five inverse discrete cosine transformation circuits to transform the DCT coefficients into windowing domain coefficients.

What is needed, therefore, is a method and device for performing the down mixing process in the frequency domain so as to reduce the amount of computation and hardware complexity for an AC-3 decoder.

SUMMARY OF THE INVENTION

Improved down mixing of digital audio signals is achieved by performing down mixing in the frequency domain. An apparatus for decoding a digital audio bit stream comprising a first set of frequency domain coefficients representing a first set of time domain audio signals from a plurality of audio channels is presented. The apparatus comprising: a means for performing down mixing of the first set of frequency domain coefficients to produce a second set of frequency domain coefficients representing a reduced number of audio channel signals; a means for transforming the second set of frequency domain coefficients into a set of windowing domain coefficients; and a means for performing overlap-and-add function on the set of windowing domain coefficients to generate a second set of time domain signals for a reduced number of audio channels.

An algorithm for transforming short DCT coefficients into long DCT coefficients to facilitate the process of down mixing the frequency coefficients is presented. The short DCT coefficients are multiplied with a set of transformation coefficients, with the transformation coefficients being approximated by polynomial expansion coefficients.

One advantage of the present invention is to provide a simple method to reduce the total number of multiplications required for down mixing the audio channels of an AC-3 encoded audio signal. This reduces the complexity of the decoder device, reducing the overall construction cost.

Another advantage is that by simplifying the computation complexity, it is capable to use software program to perform the AC-3 decoding process, rather than using a dedicated hardware decoder.

Other features, advantages and embodiments of the invention will be apparent to those skilled in the art from the following description, accompanying drawings and appended claims.

DESCRIPTION OF THE INVENTION

Appendix A is a paper submitted to the IEEE Transactions on Speech and Audio Processing on Dec. 24, 1997. The paper describes the principles incorporated in the present invention for down mixing an AC-3 bit stream.

For the convenience of description, equations (1) to (6) are written using matrix representation. For the inverse discrete cosine transform of the long DCT coefficients, equation (4) can be rewritten as:

$$\tilde{W}_f = \begin{bmatrix} \tilde{W}_{f1} \\ \tilde{W}_{f2} \end{bmatrix} = \begin{bmatrix} L_1^+ \\ L_2^+ \end{bmatrix} Y_f \qquad (8)$$

where $Y_f$ is a 256×256, diagonal matrix comprising of the long DCT coefficients extracted by the pre-processor, and $$\langle L_1^+ \rangle_{n,k} = \cos\left(\frac{\pi}{1024}(2n+1+256)(2k+1)\right) \qquad (9)$$
for $0 \le n \le 255$, $0 \le k \le 255$ $$\langle L_2^+ \rangle_{n,k} = \cos\left(\frac{\pi}{1024}(2n+1+768)(2k+1)\right) \qquad (10)$$
for $0 \le n \le 255$, $0 \le k \le 255$ For the inverse discrete cosine transform of the short DCT coefficients, equation (5) can be rewritten as:

$$\tilde{W}_f = \begin{bmatrix} \tilde{W}_{f1} \\ \tilde{W}_{f2} \end{bmatrix} = \begin{bmatrix} S_1^+ & 0 \\ 0 & S_2^+ \end{bmatrix} \begin{bmatrix} Y_{f1} \\ Y_{f2} \end{bmatrix} \qquad (11)$$

where $Y_{f1}$ and $Y_{f2}$ are 128×128 diagonal matrices comprising of the short DCT coefficients extracted by the pre-processor. The matrix $Y_{f1}$ comprise the first portion of the short DCT coefficients extracted by the pre-processor, and the matrix $Y_{f2}$ comprise the second portion of the short DCT coefficients. The terms $S_1^+$ and $S_2^+$ are denoted by:

$$\langle S_1^+ \rangle_{n,k} = \cos\left(\frac{\pi}{512}(2n+1)(2k+1)\right) \qquad (12)$$
for $0 \le n \le 255$, $0 \le k \le 127$ $$\langle S_2^+ \rangle_{n,k} = \cos\left(\frac{\pi}{512}(2n+1)(2k+1+256)\right) \qquad (13)$$
for $0 \le n \le 255$, $0 \le k \le 127$ For the overlap-and-add process, equation (6) can be rewritten as:

$$\tilde{X}_f = \begin{bmatrix} F_1 & F_2 \end{bmatrix} \begin{bmatrix} \tilde{W}_{f1} \\ \tilde{W}_{(f-1)2} \end{bmatrix} \qquad (14)$$

where $F_1$ and $F_2$ are 256×256 diagonal matrices with the entries defined as $\langle F_1 \rangle_{nn} = f(n)$ and $\langle F_2 \rangle_{nn} = f(256+n)$.

Figure 3:
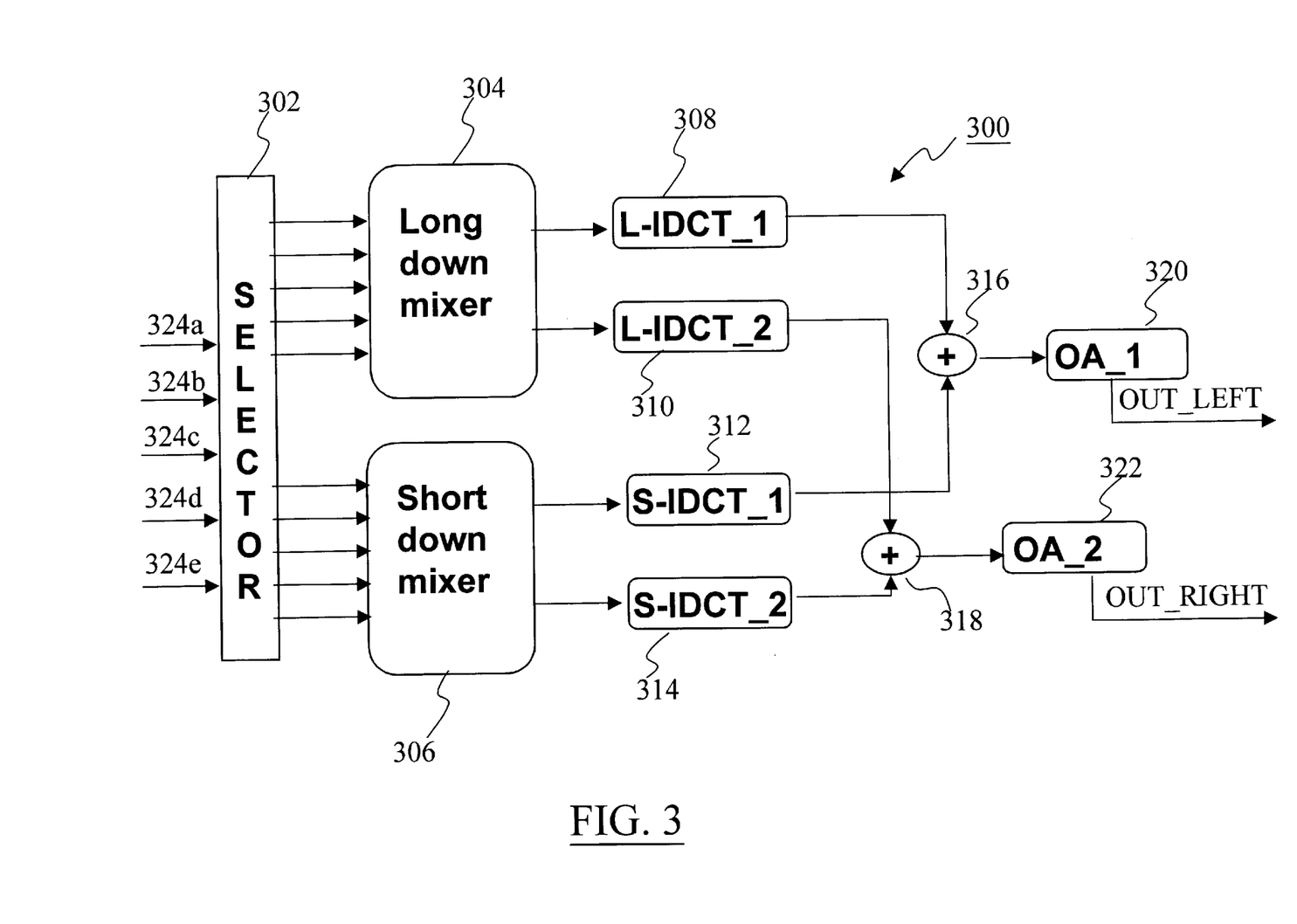
FIG. 3 is a block diagram of a decoder for down mixing in the frequency domain, using both long discrete cosine transforms and short discrete cosine transforms.

FIG. 3 shows an audio decoder for down mixing in two DCT domains (the long DCT domain and short DCT domain). Audio decoder 300 comprises a selector 302, a long down mixer 304, a short down mixer 306, two long inverse discrete cosine transform blocks L-IDCT_1 308 and L-IDCT_2 310, two short inverse discrete cosine transform blocks S-IDCT_1 312 and S-IDCT_2 314, two signal adders 316 and 318, and two overlap-and-add blocks OA_1 320 and OA_2 322.

The audio decoder 300 performs down mixing, inverse discrete cosine transforms, and overlap-and-add functions to generate a reduced number of audio channels than was originally encoded in the input digital bit stream.

The selector 302 receives DCT coefficients from signal lines 324a to 324e, and determines whether the incoming coefficients are long DCT coefficients ($Y_f$) or short DCT coefficients ($Y_{f1}$ and $Y_{f2}$). The long and short DCT coefficients are directed to the long down mixer 304 and short down mixer 306 respectively. The long down mixer 304 performs the down mixing to produce the down mixed long DCT coefficients using the following algorithm:

$$\begin{bmatrix} Y_f(L_D) \\ Y_f(R_D) \end{bmatrix} = \begin{bmatrix} 1 & C & 0 & S & 0 \\ 0 & C & 1 & 0 & S \end{bmatrix} \begin{bmatrix} Y_f(L) \\ Y_f(C) \\ Y_f(R) \\ Y_f(S_L) \\ Y_f(S_R) \end{bmatrix} \qquad (15)$$

where $Y_f(L_D)$ and $Y_f(R_D)$ are the down mixed DCT coefficients for the left and right channels. The matrices $Y_f(L)$, $Y_f(C)$, $Y_f(R)$, $Y_f(S_L)$, $Y_f(R_L)$ comprise the long DCT coefficients extracted by the pre-processor for the left, center, right, left surround, and right surround channels. The matrix I is an identity matrix, and the matrices C and S are 256×256 diagonal matrices denoted by:

$$C = \begin{bmatrix} c & 0 & \dots & 0 \\ 0 & c & \dots & 0 \\ 0 & 0 & \dots & 0 \\ 0 & 0 & \dots & c \end{bmatrix} \quad S = \begin{bmatrix} s & 0 & \dots & 0 \\ 0 & s & \dots & 0 \\ 0 & 0 & \dots & 0 \\ 0 & 0 & \dots & s \end{bmatrix} \qquad (16)$$

Here c and s are the mixing coefficients for the center and surround channels, typically chosen between 0.5 to 1.

The short down mixer 306 performs the down mixing on the short DCT coefficients to generate the down mixed short DCT coefficients using the following equations:

$$\begin{bmatrix} Y_{f1}(L_D) \\ Y_{f1}(R_D) \end{bmatrix} = \begin{bmatrix} I & C & 0 & S & 0 \\ 0 & C & I & 0 & S \end{bmatrix} \begin{bmatrix} Y_{f1}(L) \\ Y_{f1}(C) \\ Y_{f1}(R) \\ Y_{f1}(S_L) \\ Y_{f1}(S_R) \end{bmatrix} \qquad (17)$$

$$\begin{bmatrix} Y_{f2}(L_D) \\ Y_{f2}(R_D) \end{bmatrix} = \begin{bmatrix} I & C & 0 & S & 0 \\ 0 & C & I & 0 & S \end{bmatrix} \begin{bmatrix} Y_{f2}(L) \\ Y_{f2}(C) \\ Y_{f2}(R) \\ Y_{f2}(S_L) \\ Y_{f2}(S_R) \end{bmatrix} \qquad (18)$$

where $Y_{f1}(L_D)$, $Y_{f1}(R_D)$, $Y_{f2}(L_D)$, and $Y_{f2}(R_D)$ are the down mixed short DCT coefficients for the left and right channels. Here C and S are 128×128 diagonal matrices comprising the center and surround mixing coefficients.

The down mixed long DCT coefficients from the long down mixer 304 are sent to the inverse discrete transformers L-IDCT_1 308 and L-IDCT_2 310 to process the DCT coefficients for the left and right channels. The L-IDCT_1 308 and L-IDCT_2 310 transforms the long DCT coefficients into the long windowing domain coefficients according to the following algorithm:

$$\begin{bmatrix} \tilde{W}_{f1}(L_0) \\ \tilde{W}_{f1}(R_0) \end{bmatrix} = \begin{bmatrix} L_1^+ & 0 \\ 0 & L_1^+ \end{bmatrix} \begin{bmatrix} Y_f(L_D) \\ Y_f(R_D) \end{bmatrix} \qquad (19)$$

$$\begin{bmatrix} \tilde{W}_{f2}(L_0) \\ \tilde{W}_{f2}(R_0) \end{bmatrix} = \begin{bmatrix} L_2^+ & 0 \\ 0 & L_2^+ \end{bmatrix} \begin{bmatrix} Y_f(L_D) \\ Y_f(R_D) \end{bmatrix} \qquad (20)$$

Likewise, the output coefficients from the short down mixer 306 are sent to the inverse discrete transformers S-IDCT_1 312 and S-IDCT_2 314 to process the short DCT coefficients for the left and right channels. The S-IDCT_1 312 and S-IDCT_2 314 transforms the DCT coefficients into short windowing domain coefficients according to the following equations:

$$\begin{bmatrix} \tilde{W}_{f1}(L_0) \\ \tilde{W}_{f1}(R_0) \end{bmatrix} = \begin{bmatrix} S_1^+ & 0 \\ 0 & S_1^+ \end{bmatrix} \begin{bmatrix} Y_{f1}(L_D) \\ Y_{f1}(R_D) \end{bmatrix} \quad (21)$$

$$\begin{bmatrix} \tilde{W}_{f2}(L_0) \\ \tilde{W}_{f2}(R_0) \end{bmatrix} = \begin{bmatrix} S_2^+ & 0 \\ 0 & S_2^+ \end{bmatrix} \begin{bmatrix} Y_{f2}(L_D) \\ Y_{f2}(R_D) \end{bmatrix} \quad (22)$$

The short windowing domain coefficients generated by the short inverse discrete cosine transformers S-IDCT_1 312 and S-IDCT_2 314 are combined with the long windowing domain coefficients at the signal adders 316 and 318. The combined signals from the signal adders 316 and 318 are then sent to the overlap-and-add blocks OA_1 320 and OA_2 322, and transformed into time domain signals according to the algorithm:

$$\begin{bmatrix} X_f(Lo) \\ X_f(Ro) \end{bmatrix} = \begin{bmatrix} F_1 & F_2 & 0 & 0 \\ 0 & 0 & F_1 & F_2 \end{bmatrix} \left( \begin{bmatrix} \tilde{W}_{f1}(Lo) \\ \tilde{W}_{(f-1)2}(Lo) \\ 0 \\ 0 \end{bmatrix} + \begin{bmatrix} 0 \\ 0 \\ \tilde{W}_{f1}(Ro) \\ \tilde{W}_{(f-1)2}(Ro) \end{bmatrix} \right) \quad (23)$$

where $X_f(L_o)$ and $X_f(R_o)$ are the down mixed time domain audio signals for the left and right channels. The time domain audio signals are then sent to amplification units or loud speakers.

Figure 4:
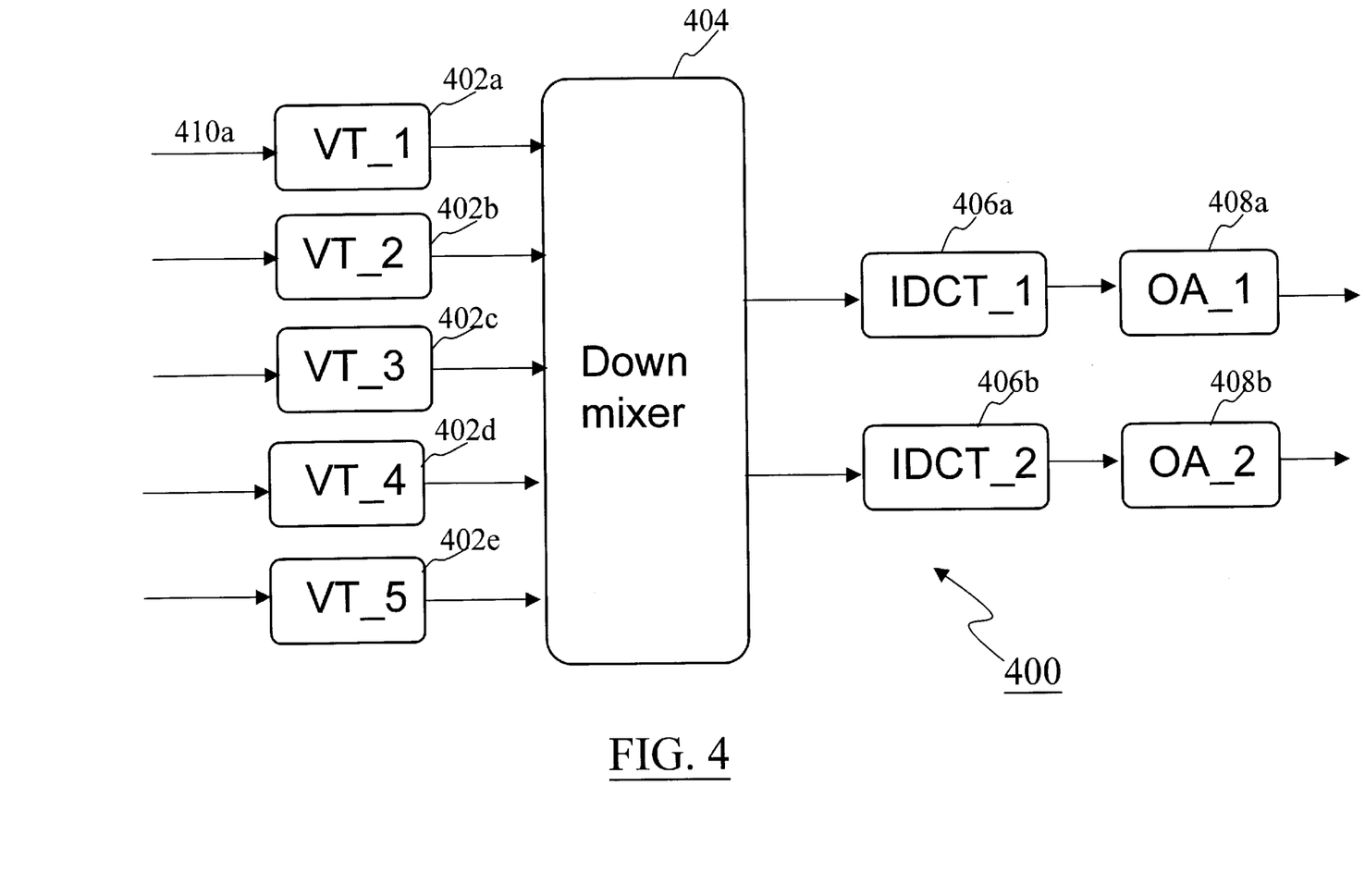
FIG. 4 is a block diagram of a preferred embodiment of the present invention. The decoder comprises virtual transformers for transforming the short DCT coefficients into long DCT coefficients, and performs down mixing in the frequency domain.

FIG. 4 shows a preferred embodiment of the present invention. To reduce the number of inverse discrete cosine transforms required for the down mixing process, the short DCT coefficients are first transformed to long DCT coefficients, and then down mixing are performed on the long DCT coefficients. The decoder 400 comprises five virtual transformers VT_1 402a, VT_2 402b, VT_3 402c, VT_4 402d, VT_5 402e, a down mixer 404, two inverse discrete cosine transformers IDCT_1 406a and IDCT_2 406b, and two overlap-and-add blocks OA_1 408a and OA_2 408b.

The virtual transformers receive incoming signals from the five channels, and determine whether the frames contain short DCT coefficients or long DCT coefficient's. The short DCT coefficients are transformed into long-DCT coefficients using the following equation:

$$Y_f = V \begin{bmatrix} Y_{f1} \\ Y_{f2} \end{bmatrix} \quad (24)$$

where $$V = [V_1 V_2] = [L_1 \cdot H_1 \cdot F_1 \cdot S_1^+ L_2 \cdot H_2 \cdot F_2 \cdot S_2^+] \quad (25)$$

Here $Y_{f1}$ and $Y_{f2}$ comprise the short DCT coefficients, and $$\langle L_1 \rangle_{kn} = \frac{1}{256} \cos\left(\frac{\pi}{1024}(2n+1+256)(2k+1)\right), \quad (26)$$
$$0 \le k \le 255, 0 \le n \le 255$$

$$\langle L_2 \rangle_{kn} = \frac{1}{256} \cos\left(\frac{\pi}{1024}(2n+1+768)(2k+1)\right), \quad (27)$$
$$0 \le k \le 255, 0 \le n \le 255$$

The matrices $H_1$, $H_2$ are diagonal matrices with entries $\langle H_1 \rangle_{nn} = h(n)$, $0 \le n \le 255$, $\langle H_2 \rangle_{nn} = h(n+256)$, $0 \le n \le 255$;

and $F_1$, $F_2$, $S_1^+$, $S_2^+$ are similar to those denoted in equations (12), (13), and (14). Equation (25) can be rewritten as:

$$Y_f(k_1) = \sum_{k_2=0}^{127} \{V_1(k_1, k_2) Y_{f_1}(k_2) + V_2(k_1, k_2) Y_{f_2}(k_2)\} \quad (28)$$

For $k1 = 0 \ldots 255$

Which can be further simplified by approximating the terms which are insignificant using $2^{nd}$ or $3^{rd}$ order polynomial expansion. It can be shown that most of the terms of $V_1(k_1,k_2)$ concentrates near $k_2=k_1/2$, so the terms farther away from $k\frac{1}{2}$ can be approximated by polynomial coefficients without losing much accuracy.

Rewrite the first term of (29) as $$Y_f^1(k_1) = \sum_{k_2=0}^{127} \{V_1(k_1, k_2) Y_{f_1}(k_2)\} \quad (29)$$

We can separate the terms of the above equation into three portions, one center portion contains the terms at the neighborhood of $k2=k\frac{1}{2}$, one portion before the center portion, and the remaining portion after the center portion.

$$Y_f^1(k_1) = \sum_{k_2=0}^{\left\lfloor \frac{k_1}{2} \right\rfloor - M} \{V_1(k_1, k_2) Y_{f_1}(k_2)\} + \quad (30)$$

$$\sum_{k_2=\left\lfloor \frac{k_1}{2} \right\rfloor - M+1}^{\left\lfloor \frac{k_1}{2} \right\rfloor + M} \{V_1(k_1, k_2) Y_{f_1}(k_2)\} + \sum_{k_2=\left\lfloor \frac{k_1}{2} \right\rfloor + M+1}^{127} \{V_1(k_1, k_2) Y_{f_1}(k_2)\}$$

Here the center portion has a length of 2M points. We then approximate the first and third terms in equation (30) using p-th order polynomials:

$$V_1(k_1, k_2) = \sum_{p=0}^{P-1} a(k_1, p) k_2^p \text{ for } k_2 = 0, \ldots, \left\lfloor \frac{k_1}{2} \right\rfloor - M \quad (31)$$

$$V_1(k_1, k_2) = \sum_{p=0}^{P-1} b(k_1, p) k_2^p \text{ for } k_2 = \left\lfloor \frac{k_1}{2} \right\rfloor - M+1, \ldots, 127 \quad (32)$$

Here a and b are the polynomial expansion coefficients $$k_2 = 0, \ldots, \left\lfloor \frac{k_1}{2} \right\rfloor - M \text{ and } k_2 = \left\lfloor \frac{k_1}{2} \right\rfloor - M+1, \ldots, 127$$

respectively. Calculating the first and third terms in equation (30) using polynomial approximations is much faster than expanding the summation of $V_1 \cdot Y_{f1}$ with all the cosine terms.

Furthermore, it can be shown that there is a one-to-one correspondence between $V_1(k_1,k_2)$ and $V_2(k_1,k_2)$:

$$V_2(k_1,k_2) = (-1)^{(k1+k2)} \times V_1(255-k_1, 127-k_2) \quad (33)$$

Therefore, we can calculate $V_2$ once we have obtained the terms for $V_1$. This can be used in the calculation of $$Y_f^2(k_1) = \sum_{k_2=0}^{127} \{V_2(k_1, k_2)Y_{f_2}(k_2)\} \quad (34)$$

By combining the results of equations (31) and (35), we obtain the long DCT coefficients of equation (29).

After the virtual transformers VT_1 402*a* to VT_5 402*e* turns the short DCT coefficients to long DCT coefficients (when appropriate), the long DCT coefficients are sent to the down mixer 404. The down mixer 404 down mixes the long DCT coefficients using equation (16) described above. The down mixed long DCT coefficients are then sent to the inverse discrete cosine transformers 406*a* and 406*b*. Then the windowing domain coefficients generated by the inverse discrete cosine transformers 406*a*, 406*b* are sent to the overlap-and-add blocks 408*a* and 408*b*, which generate time domain audio signals for the left and right channels.

While the above is a full description of the specific embodiments, various modifications, alternative constructions and equivalents may be used. For example, down mixing is not limited for used in the AC-3 algorithm. Other audio compression algorithms having more than 2 audio channels, such as MPEG-2 or DTS, may require down mixing to be performed when the number of speaker amplifiers are less than the number of audio channels in the digital-bit stream. Therefore, the above description and illustrations should not be taken as limiting the scope of the present invention which is defined by the appended claims.

What is claimed is:

1. An apparatus for decoding a pre-processed digital audio bit stream, the audio bit stream having a set of short DCT coefficients and a first set of long DCT coefficients, representing a first set of time domain audio signals from a plurality of distinct audio channels, said apparatus comprising:

first transforming means for transforming the set of short DCT coefficients into a second set of long DCT coefficients;

down mixing means for down mixing the first set of long DCT coefficients and said second set of long DCT coefficients, producing a third set of long DCT coefficients for a predetermined number of audio channel signals;

second transforming means for transforming said third set of long DCT coefficients into a second set of time domain signals for a reduced number of distinct audio channels relative to those represented by said first set of time domain coefficients.

2. The apparatus of claim 1, wherein said second transforming means comprises:

DCT-to-window transforming means for transforming said third set of long DCT coefficients into a set of windowing domain coefficients; and overlap-and-add means for performing overlap-and-add on said set of windowing domain coefficients thereby generating said second set of time domain signals.

3. The apparatus of claim 1, wherein said first transforming means generates long DCT coefficients from short DCT coefficients using the following equation:

$$Y_f(k_1) = \sum_{k_2=0}^{127} \{V_1(k_1, k_2)Y_{f_1}(k_2) + V_2(k_1, k_2)Y_{f_2}(k_2),$$

wherein, $Y_{f_1}(k_1,k_2)$ and $Y_{f_2}(k_1,k_2)$ are the short DCT coefficients, $V_1(k_1,k_2)$ and $V_2(k_1,k_2)$ are the transformation coefficients, $Y_f(k_1)$ are the long DCT coefficients, and $k_1$ has integer values from 0 to 255.

4. The apparatus of claim 3, wherein at least one term of the transformation coefficients $V_1(k_1,k_2)$ is calculated using polynomial approximation.

5. The apparatus of claim 3, wherein $V_2(k_1,k_2)$ is calculated using the following equation:

$$V_2(k_1,k_2) = (-1)^{(k_1+k_2)} \times V_1(255-k_1, 127-k_2).$$

6. A method of down mixing a digital audio bit stream having a first set of DCT coefficients for representing a first set of time domain audio signals from a plurality of audio channels, the first set of DCT coefficients including a set of short DCT coefficients and a first set of long DCT coefficients, said method comprising the steps of:

(a) transforming the set of short DCT coefficients into a second set of long DCT coefficients;

(b) down mixing the first set of long DCT coefficients and the second set of long DCT coefficients in combination, thereby producing a down mixed set of DCT coefficients; and (c) transforming said down mixed set of DCT coefficients thereby producing a second set of time domain signals for a predetermined number of audio channels.

7. The method of claim 6, wherein the DCT coefficient transformation step comprises the steps of:

(c1) inverse discrete cosine transforming said down mixed set of DCT coefficients, thereby generating a set of windowing domain coefficients; and (c2) performing overlap-and-add on said set of windowing domain coefficients thereby producing said second set of time domain signals.

8. The method of claim 1, wherein said short DCT coefficient transformation step generates said second set of long DCT coefficients from the set of short DCT coefficients using the following equation:

$$Y_f(k_1) = \sum_{k_2=0}^{127} \{V_1(k_1, k_2)Y_{f_1}(k_2) + V_2(k_1, k_2)Y_{f_2}(k_2),$$

wherein $Y_{f_1}(k_1,k_2)$ and $Y_{f_2}(k_1,k_2)$ are the short DCT coefficients, $V_1(k_1,k_2)$ and $V_2(k_1,k_2)$ are the transformation coefficients, $Y_f(k_1)$ are the second set of long DCT coefficients, and $k_1$ has integer values from 0 to 255.

9. The method of claim 8, wherein at least one term of the transformation coefficients $V_1(k_1,k_2)$ is calculated using polynomial approximation.

10. The method of claim 8, wherein $V_2(k_1,k_2)$ is calculated from $V_1(k_1,k_2)$ using the following equation:

$$V_2(k_1,k_2) = (-1)^{(k_1+k_2)} \times V_1(255-k_1, 127-k_2).$$

11. A method of down mixing a pre-processed digital audio bit stream having a first set of frequency domain coefficients representing audio signals from at least a left, a right, a left surround, and a right surround audio channels, said method comprising the steps of:

(a) transforming blocks of said first set of frequency domain coefficients having short DCT coefficients into blocks of frequency domain coefficients having only long DCT coefficients, thereby generating a second set of frequency domain coefficients comprising only long DCT coefficients; and (b) down mixing said second set of frequency domain coefficients thereby generating a third set of frequency domain coefficients for audio signals for a left and a right audio channel.

12. The method of claim 11, wherein said transformation of short DCT coefficients into long DCT coefficients comprises vector multiplication of the short DCT coefficients with a set of virtual transformation coefficients.

13. The method of claim 12, wherein at least one term of said virtual transform coefficients are approximated using polynomial expansion.

14. A computer program product comprising:

a computer useable medium having computer readable program code means embodied therein for decoding a pre-processed digital audio bit stream, the audio bit stream having a first set of frequency domain coefficients representing a first set of time domain audio signals from a plurality of distinct audio channels, the first set of frequency domain coefficients having a set of short DCT coefficients and a first set of long DCT coefficients, the computer readable program code means in the computer program product comprising:

computer readable program code means for transforming the set of short DCT coefficients thereby producing a second set of long DCT coefficients;

computer readable program code means for transforming the first set of of long DCT coefficients and said second set of long DCT coefficients in combination, thereby producing a second set of frequency domain coefficients having mainly long DCT coefficients;

computer readable program code means for down mixing said second set of frequency domain coefficients thereby producing a third set of frequency domain coefficients for a predetermined number of audio channels;

computer readable program code means for transforming said third set of frequency domain coefficients thereby producing a second set of time domain signals for a reduced number of audio channels relative to those represented by said first set of time domain coefficients.

* * * * *